UNITED STATES PATENT OFFICE.

LEWIS S. CHICHESTER, OF BROOKLYN, NEW YORK.

IMPROVEMENT IN FOOD FOR INFANTS FROM CEREALS.

Specification forming part of Letters Patent No. 144,508, dated November 11, 1873; application filed June 21, 1873.

*To all whom it may concern:*

Be it known that I, LEWIS S. CHICHESTER, of Brooklyn, in the county of Kings and State of New York, have invented an Improvement in the Preparation of Cereals for Food, of which the following is a specification:

This invention is made especially with reference to the preparation of food for infants, and, as such, is an improvement upon the article described in Letters Patent No. 136,304; but a portion of the process of preparing may be employed in the preparation of other articles of food, such as those described in my patent No. 136,305.

I make use of barley that is ground, and mix with the same the nitrates and phosphates of wheat, obtained by pulverizing the wheat, so as to separate the starch by sifting the same. These nitrates and phosphates are to be mixed with the ground barley in such a proportion as to form a compound containing as nearly as possible the elements of human milk. The proportions of course will depend somewhat upon the quality of the barley and wheat, respectively, and the material produced from this compound, prepared in substantially the manner next described, is a new article of manufacture.

I have discovered that there is difficulty in baking the compound of cereals above (and as set forth in my aforesaid patents) in such a manner that the action of the heat and the materials treated will be entirely uniform throughout. When rolled out into a sheet, the vapors are liable to be confined, and the central portion of the sheet rendered of a different consistency to the surfaces. I prevent this difficulty by granulating the mass after it has been moistened with water. I find that this can easily be done after the mass has been sufficiently moistened by rubbing the same through a sieve or between the hands, as the materials break up into granules or small lumps, the absence of starch promoting this operation. The granules remain sufficiently separate when contained in a suitable pan and in a layer of moderate thickness—say half an inch to an inch; and while being baked the vapors pass off freely, and the action of the heat is very uniform throughout the entire mass.

The grinding operation is employed to reduce the baked particles, and the food, prepared as aforesaid, is mixed with boiling water and boiled, or boiled in water or other liquid.

I claim as my invention—

1. The infants' food prepared from barley and wheat, in the manner specified, as a new article of manufacture.

2. The method of preparing cereals for use by baking them in a granulated state previous to grinding, substantially as set forth.

Signed by me this 17th day of June, A. D. 1873.

LEWIS S. CHICHESTER.

Witnesses:
GEO. T. PINCKNEY,
CHAS. H. SMITH.